Figure 1:
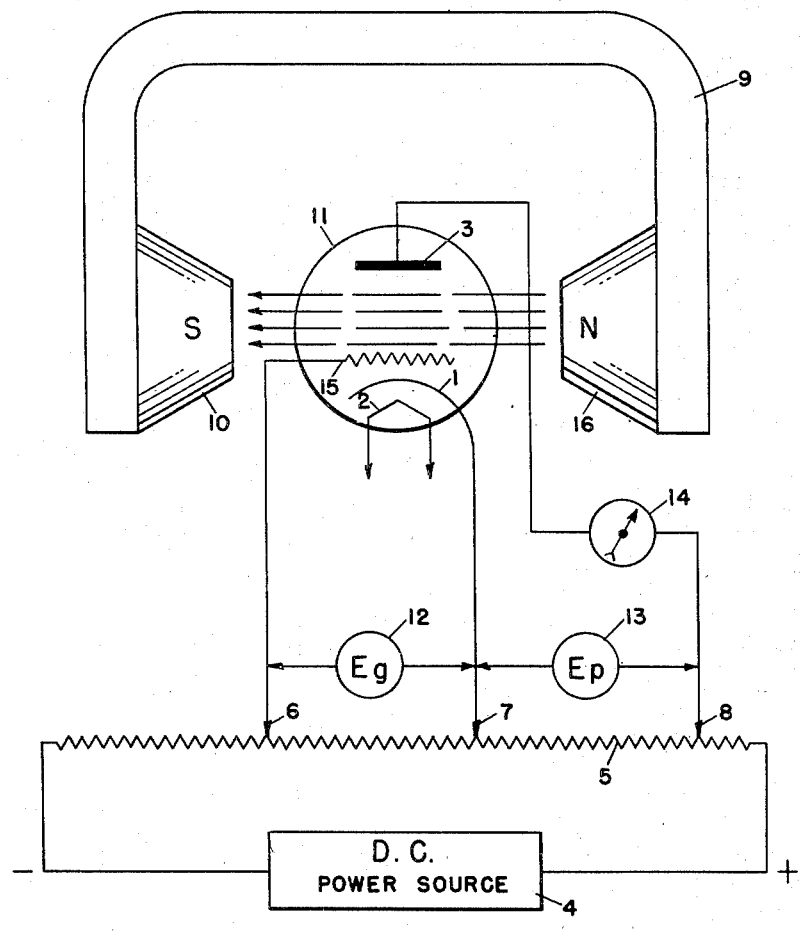

May 30, 1950     R. KINSLOW     2,509,394

VACUUM TUBE FLUX METER

Filed Dec. 31, 1946     2 Sheets-Sheet 1

INVENTOR.
Ray Kinslow
BY

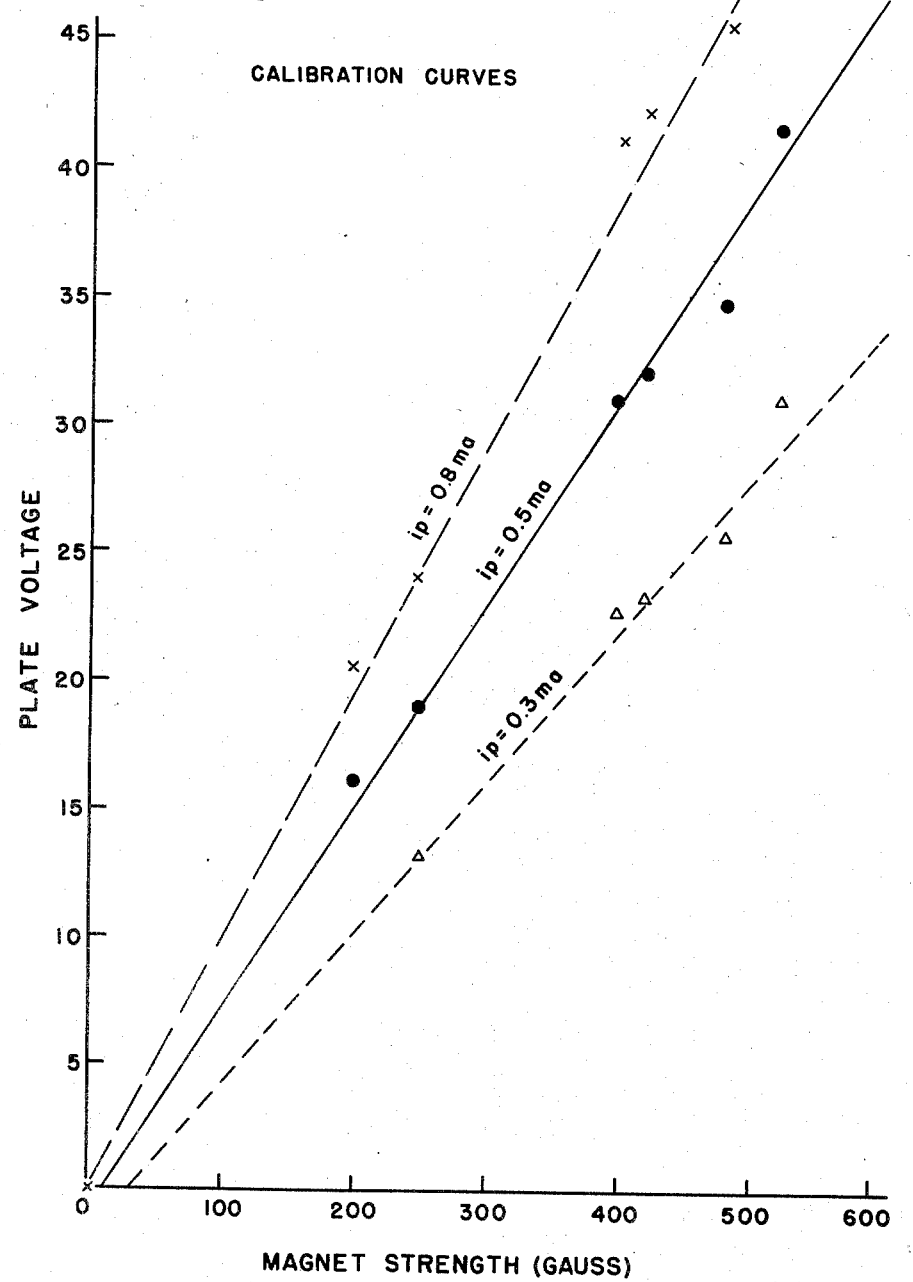

Patented May 30, 1950

2,509,394

UNITED STATES PATENT OFFICE 2,509,394

VACUUM TUBE FLUX METER

Ray Kinslow, Cookeville, Tenn., assignor to the United States of America as represented by the United States Atomic Energy Commission Application December 31, 1946, Serial No. 719,588

4 Claims. (Cl. 175—183)

My invention relates to measuring instruments and more particularly to instruments for determining the intensity and uniformity of magnetic fields.

It is often necessary to determine the strength and uniformity of the magnetic fields produced by magnets. This is particularly true with magnets which are to provide the necessary magnetic fields for mass spectrometers, wherein the field strengths must be determined and uniform fields within certain definite limits must be provided therefor.

In checking the magnetic field strength of the electron source alignment magnet, for example, it was found that the instruments normally used for such measurements, that is, a wire for passing through and cutting the lines of force of the magnetic field to produce an E. M. F., and a galvanometer or other apparatus for measuring such voltage, were not well suited to prevailing conditions since their use required a considerable amount of time and some technical skill in obtaining reliable results.

The effect of a magnetic field on an electron stream in an electrostatic field is known from work on the Magnetron and other similar devices. It is also known that when a magnetic field is positioned so as to be very nearly perpendicular to the electrostatic field within a vacuum tube, the magnetic field may be increased in intensity to such a value so as to produce a definite cut-off of the plate current, provided the plate voltage and grid bias remain constant. This plate current cut-off point being a function of the actual magnetic field strength could therefore be used as a measure of the magnetic field strength. (See textbook "Electronics" by Millman and Seely, 1941 ed.—pgs. 93 to 100.) However, this procedure fails to give the information desired with sufficient accuracy to be employed for measurement purposes of this type, and other practical problems preclude its present use.

Applicant with a knowledge of these problems in the prior art has for an object of his invention the provision of an instrument for measuring the magnetic field intensity of a magnet as well as the uniformity of the field by unskilled operators or by skilled technicians.

Applicant has as another object of his invention the provision of a vacuum tube flux meter which may be quickly and easily set up and which possesses both simplicity of operation and reliability of results.

Applicant has as a further object of his invention the provision of a vacuum tube which may be inserted in the magnetic field of a magnet and which will provide quick and accurate meter indications from which the strength of the magnetic field may be determined.

Applicant has as a further object of his invention the provision of a test procedure for determining the uniformity of a magnetic field by inserting a vacuum tube in the field and determining the field strength, and then reinserting the tube in the magnetic field with the poles reversed and again determining the field strength so that by coincidence of results, uniformity of the field may be established.

Applicant has as a still further object of his invention the provision of a vacuum tube flux meter which will indicate magnetic field intensity in terms or as a function of plate voltage with a high degree of accuracy by making use of the change in plate voltage necessary to maintain a certain predetermined plate current using a substantially constant grid bias and cathode voltage.

Other objects and advantages of my invention will appear from the following specification and accompanying drawings, and the novel features thereof will be particularly pointed out in the annexed claims.

Figure 2:
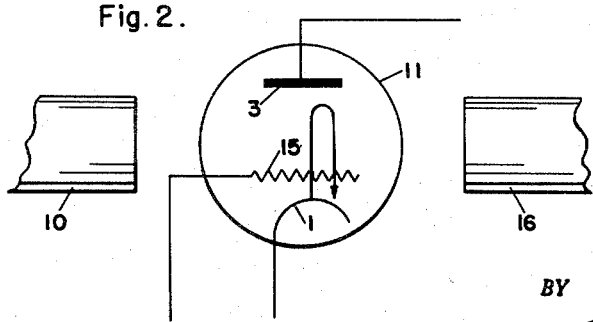

In the drawings, Fig. 1 is a schematic of my improved vacuum tube flux meter positioned between the poles of a magnet. Fig. 2 is a schematic of my improved vacuum tube flux meter with a somewhat exaggerated showing of the effect of a predominating magnetic field upon the travel of electrons under the influence of a weak electrostatic field. Fig. 3 is a graph of magnetic field intensity plotted as a function of plate voltage.

Referring to the drawings in detail, 11 designates a triode vacuum tube having a cathode 1, a heater element 2, a control grid 15, and a plate or anode 3. A battery or other power source 4 is bridged by a suitable voltage divider or potentiometer 5, having a series of movable contacts 6, 7, 8, joined to the control grid, cathode and plate, respectively. Bridged across the grid-cathode circuit of the tube is a voltmeter 12 for indicating the grid potential or bias. Bridged across the cathode-plate circuit is a voltmeter 13 for indicating the plate voltage. Connected in series with the plate circuit is a meter 14, preferably of the milliammeter type, for indicating plate current. The heater element 2 may be fed from the power source 4 or may be fed from an independent A. C. or D. C. power source (not shown). It will be noted that the movable contact 6 leading to the control grid 15, being to the left of the movable contact 7 leading to the cathode 1, is at a negative potential with respect to the cathode, and that the size of this potential may be varied by movement of either contact 6 or contact 7. It will be further noted that movable contact 8, positioned to the right of contact 7 will provide a positive potential for the plate 3 and that this potential may be varied by movement of either contact 7 or contact 8. The tube 11 is disposed within the field of a magnet 9 having poles 10, 16 which set up a magnetic field at substantially right angles to the electrostatic field set up between the cathode 1 and plate 3 of the tube 11.

Referring to Fig. 2, it will be seen from the somewhat exaggerated showing that the effect of placing the magnetic field at right angles to the electrostatic field is to cause the electrons emitted from the cathode 1 to travel in curves or arcuate paths. The stronger the magnetic field is in comparison to the electrostatic field, the smaller the radius of the electron path and in turn the current flow to the plate 3 from cathode 1, will be since more of the electrons will be deflected away from the plate. As the potential of plate 3 is reduced, a critical point is reached where no measurable current flows and where the paths of the electrons are bent back upon themselves so that the electrons may return to their original source.

A portable device of this character may be built which will lend itself to quick, easy and rapid use. The calibration of the device is effected as follows: The magnet 9, having a known field intensity, is positioned so as to be nearly perpendicular to the electrostatic field of the vacuum tube 11. The base of tube 11 is made rotatable in order to provide an adjustment so that the magnetic field alignment which produces the maximum effect upon the electron stream may be located. With a constant grid bias voltage, as indicated by meter 12, applied to grid 15, the corresponding plate voltage, as indicated by meter 13, is obtained which will produce a certain predetermined plate current, as read on the plate milliammeter 14, the cathode voltage remaining at a fixed value. Using a series of standard magnets of known field intensity or a variable calibrated electro-magnet, a calibration curve for the device at a fixed sensitivity of grid bias voltage may be obtained. The calibration curve shows the magnetic field intensity as a function of the plate voltage, since the plate current and the grid bias and cathode voltages have been maintained at a constant value. A change in sensitivity may be effected by choosing other values of voltage for the constant grid bias voltage. The number of sensitivities required will depend upon the magnitudes of the magnetic fields to be measured as well as the required accuracy of measurement necessary.

Since a reversal of the positions of the north and south poles of the field magnet 10 in Fig. 1 should theoretically not change the calibration curve, provided that the magnet field is uniform, said reversal has proven useful in checking the field uniformity of the electron source alignment magnet. Of course, poor tube geometry would affect this measurement. However, tests with a specially prepared standard magnet having a uniform field have shown that, for the tubes tested, the tube geometry was sufficiently good that 180 degree orientation of the standard magnet from its original position produced no perceptible change in the reading of the plate milliammeter 14. Since source misalignment of the electron stream of the mass spectrometer tube causes reduction of sensitivity in the mass spectrometer, and this misalignment can be caused by non-uniformity of the field in the source magnet, the detection of this lack of uniformity becomes important in mass spectrometer servicing.

By the use of a flexible cable and a special nonmagnetic vacuum tube mounting, it is possible to check the field strength of the magnets without removing the magnets from the mass spectrometer.

Fig. 3 shows a typical curve of plate voltage plotted against magnetic field intensity for given grid and cathode voltages and for a given plate current. The curves may also be plotted for different plate currents or different grid voltages. Field intensity may be quickly and easily ascertained by simply inserting the tube in the magnetic field, as previously indicated, adjusting the plate voltage until the predetermined plate current is indicated on the milliameter, and reading the plate voltage, while maintaining other voltages constant. The next step is to simply take the reading of plate voltage indicated by the meter and apply it to the graph or chart, locating the point on the curve corresponding to that plate voltage, and then ascertaining the value of the magnetic field intensity corresponding to that point on the curve, as indicated by the graph. This provides a very accurate means of determining field intensity and the apparatus may be operated by unskilled or very slightly trained technical personnel.

It is not necessary to refer to the calibration curves each time the value of a magnetic field intensity is to be ascertained. As an alternative either the Ep meter 13 can be calibrated directly in gausses or the pointer of potentiometer 8 may be made to indicate the field strength provided point 7 is fixed.

Having thus described my invention, I claim:

1. A method of measuring the strength of a magnetic field of a magnet comprising the steps of establishing a predetermined current through a triode, inserting said triode into the magnetic field between the poles of the magnet with the direction of the electrostatic field of said triode normal to the direction of the magnetic field, operating the triode with its grid at a lower potential than its plate, adjusting the current flow in the plate circuit of the triode to re-establish the magnitude thereof to substantially its predetermined value before insertion in said field, and indicating the potential of the anode of said triode which is a function of said field strength.

2. An improved method for measuring the field strength of a magnetic field with a space discharge device having cathode, control grid, and anode electrodes, comprising the steps of adjusting the grid-cathode potential of said device to a predetermined value for achieving a desired sensitivity and impressing a predetermined operating potential between said cathode and said anode for causing flow of a predetermined anode-cathode current, in the absence of said field; inserting said device into said field in such orientation that said anode-cathode electric field is substantially normal to said magnetic field, whereby said current magnitude will change; and changing said anode-cathode potential to re-establish said current magnitude at said predetermined value, the amount of change of said anode-cathode potential being an indication of said field strength.

3. An improved method for measuring the field strength of a magnetic field of unknown intensity with a space discharge device having cathode, control grid, and anode electrodes, comprising the steps of adjusting the grid-cathode potential of said device to a predetermined value for achieving a desired sensitivity and impressing operating potentials between said cathode and said anode for causing flow of a predetermined anode-cathode current in the absence of said field of unknown intensity but in the presence of a field of known intensity, thereafter inserting said device into said field of unknown intensity in such orientation that the anode-cathode electric field is substantially normal to said magnetic field, whereby said current magnitude will change; and changing said anode-cathode potential to re-establish said current magnitude at said predetermined value, the amount of change of said anode-cathode potential being an indication of said unknown field strength.

4. An improved method for measuring the field strength of a magnetic field of unknown intensity with a space discharge device having cathode, control grid, and anode electrodes, comprising the steps of adjusting the grid-cathode potential of said device to a predetermined value for achieving the desired sensitivity and successively impressing such operating potentials between said cathode and said anode as will cause flow of a predetermined anode-cathode current, in the absence of said field of unknown intensity but successively in the presence of each of a plurality of magnetic fields of known intensity; measuring the anode potential associated with each of said known fields, thereafter inserting said device in said field of unknown intensity in such orientation that said anode-cathode electric field is substantially normal to said magnetic field, whereby said current magnitude will change; changing said anode-cathode potential to re-establish said current magnitude at said predetermined value, and determining the potential of the anode of said device, which potential indicates the strength of said particular field.

RAY KINSLOW.

REFERENCES CITED

The following references are of record in the file of this patent:

UNITED STATES PATENTS

| Number | Name | Date |
| --- | --- | --- |
| 1,525,844 | White | Feb. 10, 1925 |
| 2,027,393 | McCreary | Jan. 14, 1936 |
| 2,164,302 | Barnes et al. | July 4, 1939 |
| 2,164,538 | Meier | July 4, 1939 |
| 2,246,259 | Machts | June 17, 1941 |

FOREIGN PATENTS

| Number | Country | Date |
| --- | --- | --- |
| 358,758 | Great Britain | Oct. 15, 1931 |